US008095086B2

(12) United States Patent
Noeske et al.

(10) Patent No.: US 8,095,086 B2
(45) Date of Patent: Jan. 10, 2012

(54) FM SIMULCAST BROADCAST SIGNAL BROADCAST TRANSMISSION SYSTEM AND RECEIVER DEVICE

(75) Inventors: Carsten Noeske, Sexau (DE); Christian Bock, Freiburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 634 days.

(21) Appl. No.: 12/281,584

(22) PCT Filed: Mar. 5, 2007

(86) PCT No.: PCT/EP2007/001870
§ 371 (c)(1),
(2), (4) Date: Jan. 6, 2009

(87) PCT Pub. No.: WO2007/101642
PCT Pub. Date: Sep. 13, 2007

(65) Prior Publication Data
US 2009/0220024 A1 Sep. 3, 2009

(30) Foreign Application Priority Data
Mar. 3, 2006 (DE) .......................... 10 2006 010 390

(51) Int. Cl.
*H04B 1/04* (2006.01)
(52) U.S. Cl. ........................ 455/110; 455/93; 455/503
(58) Field of Classification Search ................ 455/110
See application file for complete search history.

(56) References Cited

U.S. PATENT DOCUMENTS 5,218,717 A * 6/1993 Reitberger .................... 455/503
6,215,815 B1 * 4/2001 Chen et al. .................... 375/216
6,256,302 B1 * 7/2001 Siegle et al. .................. 370/343
6,502,069 B1 * 12/2002 Grill et al. ..................... 704/219

FOREIGN PATENT DOCUMENTS

| EP | 0 825 736 A2 | 2/1998 |
| EP | 0 843 430 A2 | 5/1998 |
| EP | 0 866 577 A2 | 9/1998 |
| EP | 1 276 257 B1 | 4/2003 |

OTHER PUBLICATIONS

Brian Chen et al: "Digital Audio Broadcasting in the FM Band by Means of Contiguous Band Insertion and Precanceling Techniques", IEEE Transactions on Communications, vol. 48, No. 10, Oct. 2000.
Papadopoulos H.C. et al: "Simultaneous Broadcasting of Analog FM and Digital Audio Signals by Means of Precanceling Techniques", Communication, 1998, ICC 98 Conference Record. 1998 IEEE International Conference on Atlanta, GA, USA Jun. 7-11, 1998, New York, NY.

* cited by examiner

*Primary Examiner* — Duc Nguyen
*Assistant Examiner* — Ajibola Akinyemi
(74) *Attorney, Agent, or Firm* — DLA Piper LLP (US)

(57) ABSTRACT

The invention relates to a FM simulcast broadcast signal, in which an analogue and digital signal are combined for a transmission in a transmission channel with limited bandwidth as a total signal (s), which has a first phase speed (vs), an auxiliary signal (hs) is prepared in the complex region from the modulated digital signal (ds) for transmission and the FM modulated analogue signal (as) for transmission, which has a second phase speed (vas). Said auxiliary signal (hs) is placed in a used or at least largely unused frequency range of the digital signal (ds). The total signal (s) for transmission comprises the auxiliary signal (hs) and the FM modulated digital signal (ds) and the first phase speed (vs) of the total signal (s) corresponds at least approximately to the second phase speed (vas) of the analogue signal (as).

13 Claims, 2 Drawing Sheets

Figure 4:
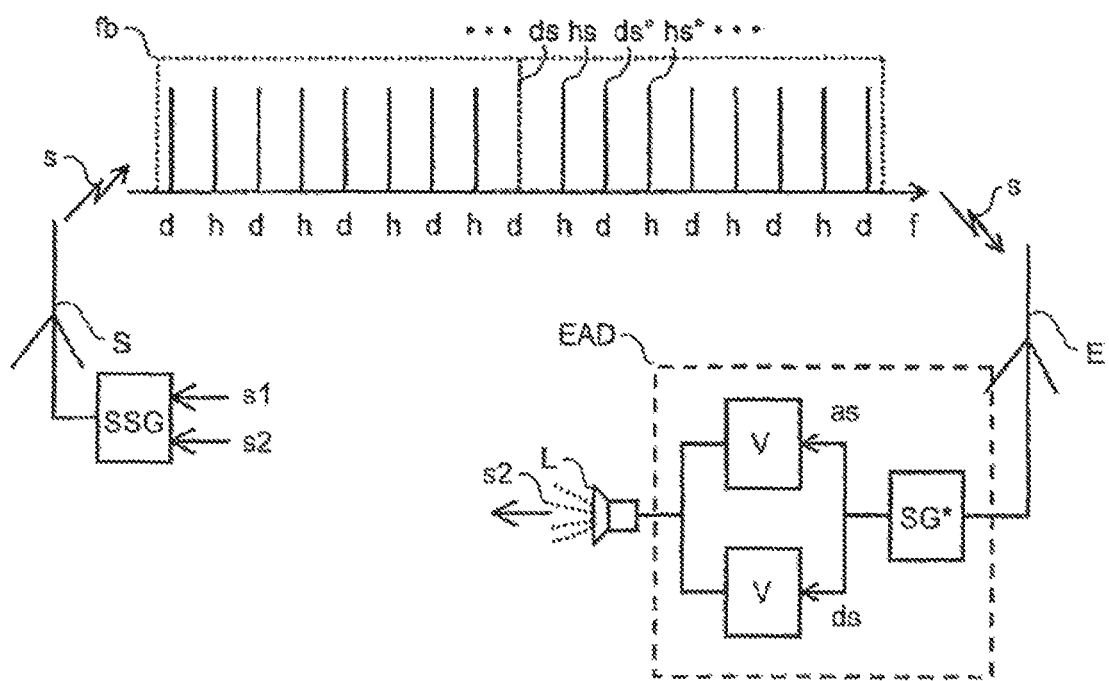

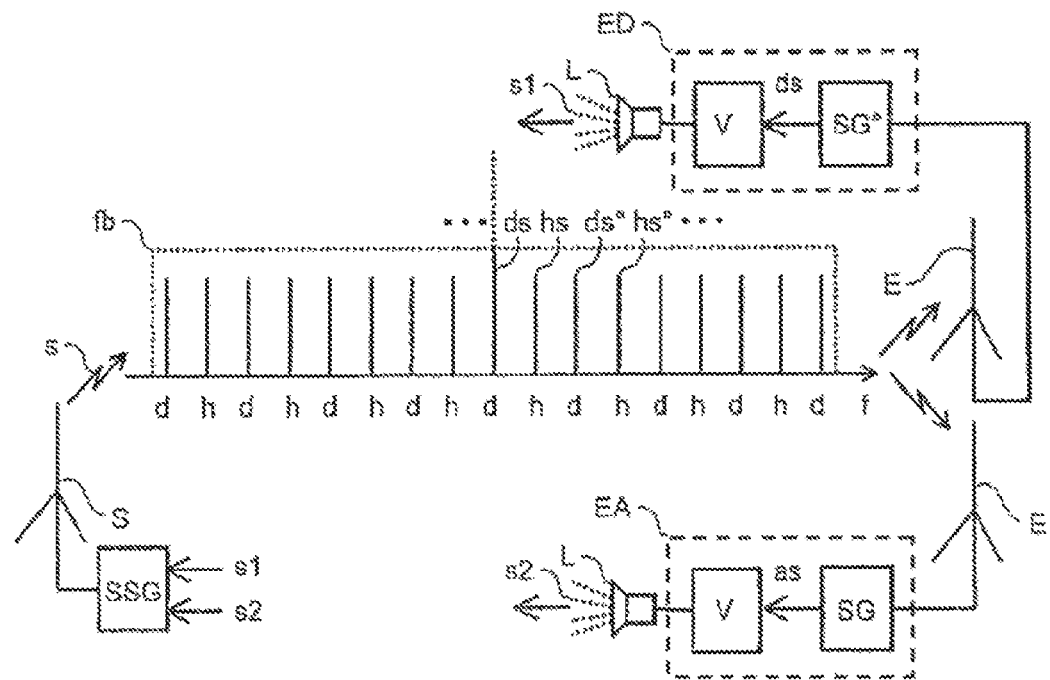
FIGURE 1
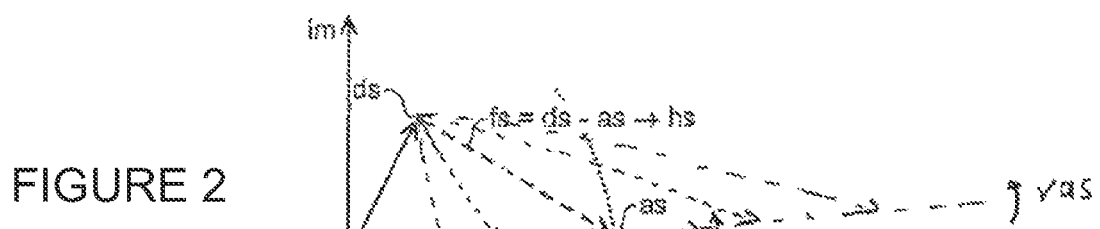
FIGURE 2
FIGURE 3
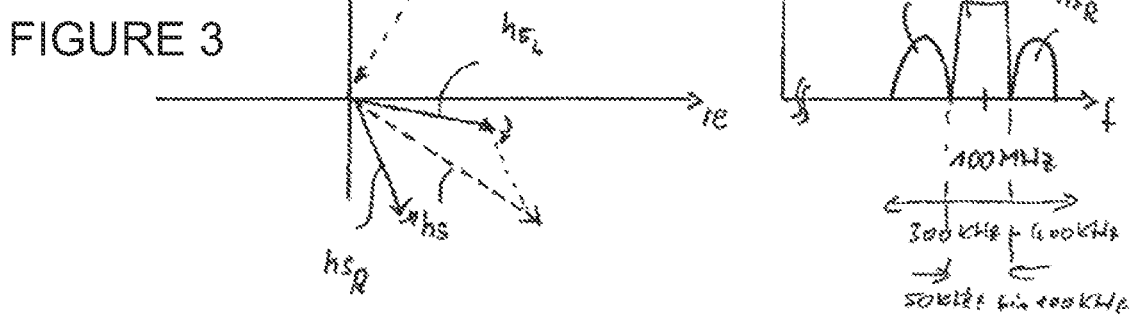

FM SIMULCAST BROADCAST SIGNAL BROADCAST TRANSMISSION SYSTEM AND RECEIVER DEVICE

PRIORITY CLAIMS/RELATED APPLICATIONS

This application is a 371 U.S. national stage filing of (and claims the benefit and priority to under 35 U.S.C. 119 and 120) PCT/EP07/001870 filed on Mar. 5, 2007, which in turn claims the benefit of and priority under 35 U.S.C. 119 to German Patent Application Serial No. 10 2006 010 390.4 filed on Mar. 3, 2006, both of which are incorporated herein by reference.

The present invention pertains to an FM-simulcast broadcast signal according to the features in the preamble of patent claim 1 and to a broadcast transmission system as well as a receiver that operates with such signals.

For the transmission of broadcast programs, data are modulated and sent to remote receivers via a radio interface. Up to now, it has not been possible to successfully introduce on the market a digital successor for the several-decades-old VHF broadcast system, which is based on a frequency modulation. One of the main problems is that developed standards such as "Digital Audio Broadcasting" (EUREKA 147) do not permit the same frequency grid as in the previous system. While the new standards operate with a bandwidth of 1.5 MHz per signal, the VHF grid uses, by contrast, approx. 300 kHz. A "smooth" migration by converting transmitters for transmitters for individual channels is therefore not possible; rather, five analog programs lying next to one another must always be switched off to be able to introduce a digital multiplex for transmitting a digital signal. For the receipt of digital programs, however, new, expensive receivers are needed, which are still barely distributed on the market, so that a program supplier with the introduction, for example, of the digital broadcast in the VHF band would have to drop his audience to almost zero.

Therefore, a primary goal is to define a signal transmissible via a radio interface, which with a fixed bandwidth, can be decoded both analogously by means of classical FM demodulation and digitally.

Presently, a sine signal is used as a carrier in the generation of an FM-demodulated signal, whose amplitude is kept at a constant value, for example, 1. The modulation takes place by means of a modulation of the phase of this carrier signal. In the frequency modulation, the phase is modulated with an integrated signal, as a result of which a sine-shaped signal with alternating zero output is generated. Such an analog signal transmitted via a radio interface is received by a conventional radio as a receiver and differentiates its phase in the receiver in time to be able to reconstruct and issue the original analog signal from useful data.

In the present introductions of digital signals in parallel to analog signals, one proceeds according to the principle of the frequency multiplex. Digital carriers are provided for a classical FM-modulated analog signal. The energy of the digital carriers is thereby adapted so that the interferences of the analog signal remain in the acceptable range.

A process by the name IBOC (In-Band On Channel) has become known from the USA, which adds digitally modulated and sharply lowered signals to the analog spectrum on the sides. Interferences are toned down or predicted, whereby mixing between digital and analog decoded signals can occur in case of poor reception. Ultimately, however, there is a strict spectral division of the analog and digital signals with an allowed overlapping range.

A drawback of the IBOC process is that it is not easily applicable in Europe because of the narrower channel grid. In addition, the protective range between adjacent channels would be reduced.

Moreover, it is disadvantageous that the data rate of the digitally modulated signal is relatively low. This lies, on the one hand, on the relatively low energy of these signals, since they may not impair the quality of the analog signal too much. Low energy implies the need for better protection against transmission errors, i.e., a higher redundancy and thus a reduction in the effectively transmissible quantity of data. On the other hand, only relatively little bandwidth is available to the carriers, which likewise leads to a reduction in the data rate.

EP 1 276 257 B1 describes a DRM/AM-simulcast signal (DRM: Digital Radio Mondeal), in which an amplitude-modulated signal is concealed in a digital signal, whereby the signal must come onto the real axis in a representation in complex space. It is disadvantageous that it is not applicable or not suitable for FM-modulated signals.

The object of the present invention is to suggest an FM-simulcast broadcast signal for providing a total signal for transmitting as a broadcast signal, especially for providing or processing FM signals, whereby a signal modulated in this manner shall make possible a better utilization of the fixed, predetermined frequency range for the transmission of digital and analog signal components.

This object is accomplished by an FM-simulcast broadcast signal according to the features of patent claim 1.

Advantageous embodiments are the subjects of the dependent claims.

Accordingly, an FM-simulcast broadcast signal is preferred, in which at least one digital and one analog signal are combined for transmission in one transmission channel with limited bandwidth as a total signal (s), which has a first phase velocity (vs). An auxiliary signal (hs) is provided, which in the complex range, is formed from the FM-modulated analog signal (as) to be transmitted, which has a second phase velocity (vas). This auxiliary signal (hs) is placed in at least one frequency range that is not or at least largely not used by the digital signal. Furthermore, the total signal (s) provided for transmission consists of the auxiliary signal (hs) and the FM-modulated digital signal (ds), whereby the first phase velocity (vs) of the total signal (s) corresponds at least approximately to the second phase velocity (vas) of the analog signal (as).

The total signal is preferably formed as a sum signal of the at least one digitally modulated carrier with the digital signal and of the auxiliary signal on the other carriers for the auxiliary signal. The auxiliary signal is thereby embodied as an approximated difference signal. The difference signal is preferably formed as a difference, especially subtraction, of at least one digital signal and of at least one analog signal, which are to be transmitted by means of the total signal.

The auxiliary signal is preferably formed from an analog signal, which is FM-modulated into the complex base band, from a second digital signal as a digitally modulated signal and by means of a difference formation of the signal FM-modulated into the complex base band and of the second, digitally modulated signal while forming a difference signal. The digitally modulated signal has, in this case, preferably a limited bandwidth that was assigned to a transmitter for a certain broadcast service. The auxiliary signal is especially formed as an approximation of the difference signal.

The difference signal may be optimized, especially minimized for forming the auxiliary signal with regard to the energy of the difference signal. The difference signal may be modified for forming the auxiliary signal for limitation to spectral components within a predetermined spectrum.

The total signal is preferably limited to a digital block, especially a digital block with a bandwidth between approx. 50-400 kHz, so that a filtering out and thus better decoding is made possible. The digital block may advantageously be positioned to the right or left of a center frequency with an auxiliary signal of the same bandwidth on the other side. The block or a digital carrier may also be positioned on a center frequency and compensation signals may be positioned on both sides of the center frequency.

Advantageous is a process, in which the total signal for transmission is generated via a multicarrier carrier with a plurality of subcarriers, whereby the digital signal components in the subcarriers are varied. The degree of freedom is utilized, which consequently results in that such a variation does not have any effect on the analog signal components detectable by an analog receiver.

Correspondingly, a process is preferred for processing a received total signal, which was provided in such a way, whereby at least one digital signal is filtered out of the total signal in a receiver, and/or in which at least one analog signal is obtained from the total signal by demodulation in the manner of an analogously FM-modulated signal. Preferably, both can be carried out by one and the same receiver, so that the receiver can be used universally also in regions with only analog or only digital transmission.

Correspondingly, a transmitter for providing such a total signal with a signal generator and a receiver for receiving such a broadcast signal are independent. The receiver is preferably designed and/or activated to produce both at least one digital signal and at least one analog signal from the total signal.

The receiver preferably has a signal generator, which is embodied and/or controlled to provide the analog signal conventional components for producing an analog signal from an FM-modulated broadcast signal. Such a signal generator is preferably embodied to filter out at least one digital signal from the received total signal.

According to the preferred process for providing a signal, a spectral division is avoided by the digitally modulated carriers being part of this signal. A classical production of an FM signal is used. Furthermore, to make it possible to receive on old receivers, for example, VHF radios, the properties of an FM signal that are primary for the FM demodulation are approximated with an artificial signal in the non-digitally used frequencies. Such a primary property is especially that the differentiated phase must produce the audio signal to be modulated. Secondary properties, which are not or not imperatively used for demodulation in the classical receiver, for example, a constant amplitude, are abandoned in favor of the integration of the digital carriers. Consequently, a degree of freedom, which is utilized for the transmission of the digital signals, is created by introducing a no longer constant but rather variable amplitude.

It is especially advantageous that the number of digital carriers and their location in the spectrum does not play a role in the signal generation and assignment to individual carriers of the available band as far as the basic idea is concerned. For example, a true data carrier for a digital signal and a carrier for an auxiliary signal may always be alternated for FM-signal modulation. The provision of a digital block of, e.g., 50-100 kHz bandwidth is especially advantageous, which makes possible a filtering out and thus better decoding of the digital signals or signal components. Such a block may be positioned, e.g., to the right or left of the center frequency of an available, limited band with an auxiliary signal of the same bandwidth on the other side. A positioning on the center frequency itself with compensation signals on both sides is also advantageous.

Such a signal generation and assignment to individual carriers is especially advantageous by virtue of a continuous converting from analog to digital operation being possible. In the case of a VHF transmitter, individual carriers may thus, over time, be switched from an occupancy for analog signal transmissions to digital signal transmissions, whereby the auxiliary signals are replaced by digitally modulated carrier signals.

However, in such a switchover, attention is advantageously paid to the fact that the number of carriers available for auxiliary signals is large enough to be able to guarantee a signal decoding or signal demodulation in an analog broadcast receiver with sufficient quality. In this regard, it is preferable if the number of carriers for digital signals make up less than half of the total, available, limited frequency range, so that enough carriers are available for the transmission of an analog broadcast signal in parallel to digital broadcast signals. At other frequency bandwidths, as is common in European space, in this regard as well, a larger or smaller number of carriers for the transmission of the auxiliary signal may be correspondingly necessary.

Since FM receivers with variable or adaptive bandwidth of the prefilter are being increasingly used, above all in the mobile range, it is advantageous in the calculation of the auxiliary signals to design the components of the spectral marginal ranges as being low to guarantee the primary FM-signal properties.

An exemplary embodiment is explained in detail below based on the drawing, in which:

FIG. 1 schematically shows an arrangement of a transmitter for providing a total signal to be transmitted via a radio interface and devices on the receiver side for receiving and processing such a total signal, whereby the total signal is composed of digital signals and auxiliary signals provided for analog signal transmission, FIG. 2 schematically shows a vector diagram in the complex plane for illustrating the production of such an auxiliary signal, FIG. 3 shows, as an example, a cutout from the frequency spectrum of the FM-simulcast broadcast signal according to the present invention, and FIG. 4 shows an arrangement corresponding to FIG. 1 with a combined receiver for receiving both digital and analog signal components of the total signal.

FIG. 1 shows an exemplary arrangement of a broadcast system, in which FM-modulated signals are transmitted in the form of a total signal s between transmitter-side and receiver-side devices, as this is known, for example, in the transmission of VHF broadcast. Therefore, the description is very concise and essentially only with a view to the preferred process for generating such a total signal s and its demodulation.

On the transmitter side, a total signal s, which is reflected via a transmission antenna S, is generated and provided in a transmitter in a signal generator SSG. In the embodiment shown, however, a pure analog transmission signal or a pure digital transmission signal is not provided. In terms of a simulcast system for digitization of frequency-modulation-based broadcast systems, a digital total signal s is provided instead of this, which also contains analog or pseudo-analog signal components, which can be received and processed by a conventional analog receiver.

In the exemplary embodiment shown, it is assumed that a first, especially analog signal s1 is available, which shall be processed and reproduced as an analog signal on the receiver side, and that a second, especially digital signal s2 is available, which shall be received and processed as a digital signal on the receiver side. The signal generator SSG correspondingly processes the first and second signals s1, s2 in such a way that they are sent by means of the total signal s.

The total signal s is fixed at a limited bandwidth fb, which is assigned to the corresponding transmitter within the theoretically available transmission spectrum for a certain region and for a certain transmission service. A plurality of carriers d, h, for example, carriers in the form of individual frequency sub-bands, is available within the limited bandwidth fb. In principle, however, a convertibility to other types of carriers is also possible, as they are known, for example, from systems with time multiplex, frequency division and the like. In particular, an orthogonal frequency division multiplex (OFDM: Orthogonal Frequency Division Multiplex) may, for example, also be used for the transmission of the total signal s.

Within the limited bandwidth fb the plurality of available carriers d, h is distributed to the individual signal components or signals of the total signal s to be transmitted. In the distribution shown, a carrier d is assigned to a digital signal ds and an auxiliary signal carrier h is assigned to an auxiliary signal hs always in an alternating manner. In principle, however, other methods of assignment are also possible. Especially preferred is an assignment of carriers h to the auxiliary signals hs in such a way that a sufficient reception quality of an analog signal as is guaranteed on the receiver side by a conventional analog receiver for receiving frequency-modulated signals. In currently available limited bandwidths fb, an assignment of carriers d, h is made in such a way that preferably more than half of the carriers, i.e., especially more than half of the available frequency range, is assigned to the auxiliary signals hs. In case of a very high number of carriers d, h within a large, available, limited bandwidth fb, such a number might, however, in principle, also be set lower. Conversely, a larger number of carriers d, h for the auxiliary signal hs compared to carriers for the digital signal ds is preferred, if only a very low, limited bandwidth is available.

On the receiver side, two exemplary receivers are shown, a first receiver EA for receiving or for providing an analog signal as and a second digital receiver ED for receiving the digital signal ds. Correspondingly, the two receivers EA, ED are each equipped with a receiving antenna E and a signal generator SG, SG° connected thereto. The signal generator SG of the analog receiver EA receives the total signal s received via the radio interface in the conventional way as an FM-modulated, conventional radio signal, demodulates this [total signal] and provides an analog signal as, which can be amplified by means of an amplifier V and distributed via a speaker L as an audio signal s2 in the usual way. Thus, the analog receiver EA is a conventional radio receiver for receiving FM-modulated broadcast transmissions transmitted, for example, via VHF.

The digital receiver ED also has a signal generator SG° designed in the usual way for digital receivers ED, which analyzes the total signal s received via the radio interface with regard to digital signals ds on the available carriers d and filters out the digital signals ds transmitted on suitable carriers d from the total signal s and applies it as an audio signal s1, e.g., to an amplifier V for amplification and distribution via a speaker L. The digital receiver ED is thus preferably a usual digital receiver ED with conventional components and functions.

In order to make possible such a simulcast system for digitization, transmission and demodulation of frequency-modulation-based broadcast systems, the total signal s is generated in a way, in which the digital signals ds, ds° on the digital carriers d assigned to them are generated, provided and transmitted in the usual way for digital signals ds. A characteristic feature lies in the provision of auxiliary signals hs, hs°, which are transmitted via auxiliary signal carriers assigned to them as the other carriers h. The auxiliary signals hs are generated in such a way that the analog receiver EA or its signal generator SG, to which the total signal s applies, is fed a supposedly analog frequency-modulated signal.

In order to make possible the function of both receivers, i.e., the digital receiver ED and the analog receiver EA, use is made of the fact that in conventional frequency-modulated transmissions for the analog receiver, ultimately only a part of the theoretically available information is relevant. This part represents a primary property, whereby the primary property, e.g., lies in the fact that the differentiated phase has to generate the audio signal to be modulated in case of a broadcast system. Correspondingly, the total signal s is constructed, such that the phase information, especially the information of the differentiated phase component, is constructed such that a seemingly usual analog receiving signal is present for the analog receiver EA. Secondary properties of the analog frequency-modulated system, such as an amplitude information left constant, i.e., not used, form, on the other hand, a degree of freedom, which is made use of for the transmission of the digital signals ds. Correspondingly, the total signal s comprises an amplitude information or amplitude modulation, in which is contained the information for the digital receiver ED.

As is also partially shown in FIG. 2, a process is described below, with which such a total signal s can be generated. In principle, however, other approaches may also be used for generating such a total signal, in which only the primary properties are used for the transmission of the analog signal component, in order to use the secondary properties for incorporating digital signals.

In a first step, the analog signal s1 to be transmitted, which is especially present as an analog audio signal, is FM-modulated in the complex base band in the signal generator SSG of the transmitter. The result is a complex, i.e., complex-value signal, which is represented by a pointer of length 1, as this is shown in FIG. 2 by the pointer represented at the analog signal point as. If the carrier were demodulated, a sine-shaped signal with high frequency would be shown lying on the real axis re, so that the amplitude or length of the lying pointer would be demodulated. Due to the frequency modulation, the point as of the analog signal is continuously moved, however, within the maximum allowable frequency deviation with a frequency modulation about the real axis re.

Then, optionally but also before or in parallel thereto, a second, digital signal s2 is provided as a digitally modulated signal of limited bandwidth. Such a digital signal is in the complex-value plane, which in FIG. 2 is spanned by the real and imaginary axes re, im, shown by a point ds for the digital signal, A pointer leading to this point ds of the digital signal preferably has a markedly lower amplitude or pointer length in the usual way for digital broadcast systems.

In a next step, a complex-value error or differentiated signal fs is formed over time by subtraction of the FM-modulated analog signal as from the digital signal ds. This error signal corresponds to the ideal for the formation for the auxiliary signals hs in the range of the spectra not used by the digital signal ds. The error signal fs thus represents a basis for generating the auxiliary signal or signals hs.

In principle, it is such that the auxiliary signal hs—a simple graphic view implied according to FIG. 2—has its starting point at ds and, at first, may end anywhere on the straight line of the signal as, because it arrives only at the angle w. These different signals hs are shown in dotted lines in FIG. 2. However, in a second condition of the signals found, it is required that the phase velocity vas of the analog signal as corresponds at least approximately to the phase velocity vs of the total signal s. In the simplest and most ideal case, it is such that the phase angle w of the analog signal as corresponds exactly or at least approximately to the phase angle of the total signal s.

FIG. 3 shows an example of the frequency spectrum of the FM-simulcast broadcast signal. The frequency spectrum of the digital signal ds with a bandwidth of, e.g., approx. 50 kHz to approx. 100 kHz, lies at an exemplary, assumed, center frequency of 100 MHz. On the left and right thereof on the outside are found an upper and a lower frequency spectrum for two auxiliary signals $hs_L$ and $hs_R$, which, combined, generate the auxiliary signal hs in the complex plane. All in all, the total signal s has approx. a bandwidth of 300 kHz to approx. 400 kHz.

Since the error signal fs has spectral components in the entire useful spectrum, i.e., even in the digital spectrum, it is modified so that it only still has spectral components in the allowed spectrum. As another criterion, the energy of the error signal fs is preferably optimized, especially minimized. For carrying out the modification and optimization, numerical processes known per se may be used for optimization purposes, and especially processes that are based on prior-art gradient processes. Modifying the error signal fs produces a resultant of the analog signal. The amplitude fluctuation brought about by the modification does not have any effect on the transmissible data of the analog signal because of the FM modulation. Consequently, a degree of freedom is provided, which can be used for the digital data. Especially in case of a so-called multicarrier carrier, i.e., a carrier with many subcarriers, the digital signal components can be varied in the subcarriers without affecting the analog reconstruction in an analog receiver.

In this way, the total signal is generated as a simulcast signal, which is no longer present as a pure FM signal, but rather corresponds to the analog signal s1 actually to be modulated in the still only differentiated phase.

FIG. 3 shows an embodiment, in which, instead of two separate receivers EA, ED, only one receiver is used as a combined receiver EAD. Correspondingly, only different aspects are dealt with below and otherwise reference is made to the explanations of FIG. 1.

The total signal s received via the radio interface is again applied to a modified signal generator SG* via a receiving antenna E. However, the signal generator SG* is modified in such a way that it can perform both a signal processing in the sense of an analog receiver and a signal processing in the sense of a digital receiver and correspondingly provides an analog signal as and a digital signal ds separate therefrom at one or two outlets. The analog signal as and the digital signal ds can be further processed in the conventional way, for example, be distributed to other devices via interfaces or be amplified via amplifiers V for acoustic reproduction via speakers L. However, according to one modification, two independent signal generators may also be provided in such a combined receiver EAD, which are designed for a digital or an analog signal provision and the total signal s received is applied to each.

According to the preferred embodiment, a sum signal is thus formed and transmitted as the total signal s, whereby the sum signal is formed, on the one hand, from a digitally modulated carrier d with the digital signal or signals ds and, on the other hand, from the auxiliary signal hs as a, preferably, approximation of the difference or error signal fs. The total signal s, including the components of the auxiliary signal or of the auxiliary signals hs, lies within the band limitation of, for example, 300 kHz, predetermined by the limited bandwidth fb. The digital components in the form of the digital signals ds are arranged on the carriers d reserved for them so that they can be filtered out individually, for example, using time multiplex or frequency division.

The process for signal generation was described based on an exemplary broadcast system in the VHF range. In principle, a conversion of the process to other frequency ranges and types of transmission systems is, however, also possible. In particular, a transmission on image-transmitting systems or image- and sound-transmitting systems as in the case of the transmission of television signals is also possible.

The invention claimed is:

1. FM-simulcast broadcast signal, in which at least one digital and one analog signal are combined for transmission in a transmission channel with limited bandwidth as a total signal (s), which has a first phase velocity (vs),
characterized in
that an auxiliary signal (hs) is provided, which is formed from the modulated digital signal (ds) to be transmitted and the FM-modulated analog signal (as) to be transmitted, which has a second phase velocity (vas),
that this auxiliary signal (hs) is placed in at least one frequency range that is not or at least largely not used by the digital signal,
that the total signal (s) provided for transmission consists of the auxiliary signal (hs) and the FM-modulated digital signal (ds), and
that the first phase velocity (vas) of the total signal (s) corresponds at least approximately to the second phase velocity (vas) of the analog signal (as).

2. FM-simulcast broadcast signal in accordance with claim 1,
characterized in that the auxiliary signal (hs) is arranged in a frequency range lying above and below the frequency range of the FM-modulated digital signal (ds).

3. FM-simulcast broadcast signal in accordance with claim 1,
characterized in that the total signal (s) is limited to a bandwidth of approx. 300 kHz to approx. 400 kHz and the digital signal (ds) to a bandwidth of approx. 50 kHz to approx. 100 kHz.

4. FM-simulcast broadcast signal in accordance with claim 1,
characterized in that a plurality of digital signals (ds) to be transmitted and a single analog signal (as) to be transmitted are combined in the total signal (s).

5. FM-simulcast broadcast signal in accordance with claim 1,
characterized in that the total signal (s) is a transmitted radio signal.

6. FM-simulcast broadcast signal in accordance with claim 1,
characterized in that the auxiliary signal (hs) in the complex range approximates the difference of the modulated digital signal (ds) to be transmitted and of the FM-demodulated analog signal (as) to be transmitted.

7. FM-simulcast broadcast signal in accordance with claim 1,
characterized in that the modulated digital signal to be transmitted is an OFDM or QAM signal.

8. FM-simulcast broadcast signal in accordance with claim 1,
characterized in that a phase angle (w) of the total signal (s) corresponds at least approximately to a phase angle of the analog signal (as).

9. Broadcast transmission system in which a simulcast signal in accordance with claim 1 is transmitted.

10. Receiver for decoding the broadcast signal form in accordance claim 1.

11. Receiver in accordance with claim 10, characterized in that it is able to decode both the digital signal (ds) and the total signal (s).

12. Receiver in accordance with claim 11, characterized in that it extracts a phase signal from the total signal (s) received and demodulates an audio signal herefrom, which essentially corresponds to the audio signal of the analog FM signal (as) to be transmitted.

13. Receiver in accordance with claim 11, characterized in that a switch is made between the receipt of the digital signal (ds) and the total signal (s) depending on the reception conditions.

* * * * *